United States Patent [19]

Ford et al.

[11] Patent Number: 4,733,997
[45] Date of Patent: Mar. 29, 1988

[54] METHOD OF PRODUCING CHAIR MATS AND THE LIKE INVOLVING EDGE TRIMMING

[75] Inventors: John R. Ford, Elk Grove Village; Robelino C. Gutierrez, Bartlett, both of Ill.

[73] Assignee: Tenex Corporation, Elk Grove Village, Ill.

[21] Appl. No.: 745,946

[22] Filed: Jun. 18, 1985

[51] Int. Cl.$^4$ .......................... B23C 1/26; B23C 1/04; B27C 5/02
[52] U.S. Cl. ........................... 409/84; 144/139; 144/142; 144/144 A; 144/144.5 R; 264/138; 409/90; 409/97; 409/110
[58] Field of Search .................. 144/144 R, 139, 142, 144/144 A, 144.5; 264/138; 425/295; 409/90, 111, 112, 122, 123

[56] References Cited

U.S. PATENT DOCUMENTS

| | | | |
|---|---|---|---|
| 487,589 | 12/1892 | Taylor | 144/144.5 X |
| 1,434,683 | 11/1922 | Cowles | 409/111 |
| 1,921,715 | 8/1933 | Whitney et al. | 144/144 R X |
| 1,959,269 | 5/1934 | Gorton | 409/122 |
| 2,361,565 | 10/1944 | Reed | 409/111 |
| 2,573,692 | 11/1951 | Constantine et al. | 144/142 |
| 2,608,908 | 9/1952 | Pankonin | 144/144 R X |
| 3,207,193 | 9/1965 | Godfrey et al. | 144/144 R |
| 3,402,641 | 9/1968 | Dawes | 73/862.39 |
| 3,833,036 | 9/1974 | Marvosh | 144/139 X |
| 3,885,612 | 5/1975 | Schell | 409/112 X |
| 3,942,566 | 3/1976 | Schmidt | 144/144 R |
| 4,394,099 | 7/1983 | Santinelli | 409/111 X |
| 4,503,613 | 3/1985 | Yax | 409/123 X |
| 4,541,466 | 9/1985 | Stegherr | 409/123 X |

FOREIGN PATENT DOCUMENTS

| | | | |
|---|---|---|---|
| 610659 | 6/1978 | U.S.S.R. | 409/112 |
| 722700 | 3/1980 | U.S.S.R. | 409/123 |

Primary Examiner—Philip Anderson
Attorney, Agent, or Firm—Niro, Scavone, Haller & Niro, Ltd.

[57] ABSTRACT

An apparatus and method for forming a workpiece or chair mat with cleats on the underside thereof, and with a marginal peripheral area void of cleats, and for trimming the edge of a generally planar workpiece. A rotatable work table is provided for positioning the workpiece. A router head includes an inclined router blade engageable with the edge of the workpiece to form a beveled ramp edge thereabout. A template is positioned between the workpiece and the work table, and the router head has a cam follower engageable with and movable along the edge of the template for guiding the router blade along the edge of the workpiece during rotation of the work table. A cooling medium is directed toward the area of engagement between the router blade and the edge of the workpiece. The depth of cut is controlled by a cam disk mounted on the bottom of the router head engageable with the top of the workpiece.

19 Claims, 13 Drawing Figures

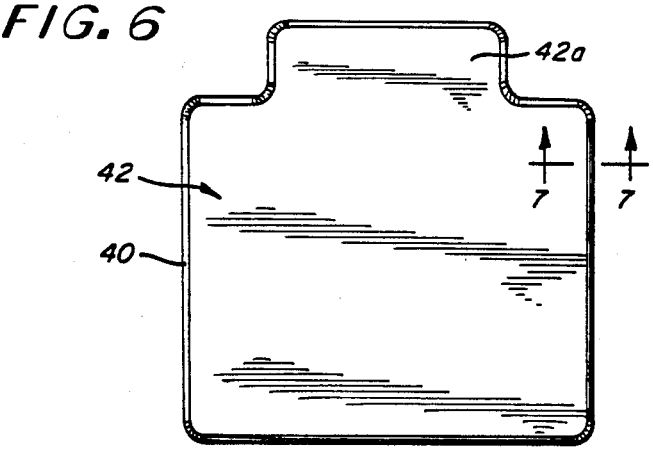
FIG. 6
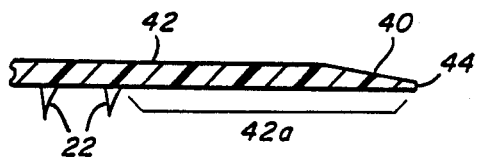
FIG. 7
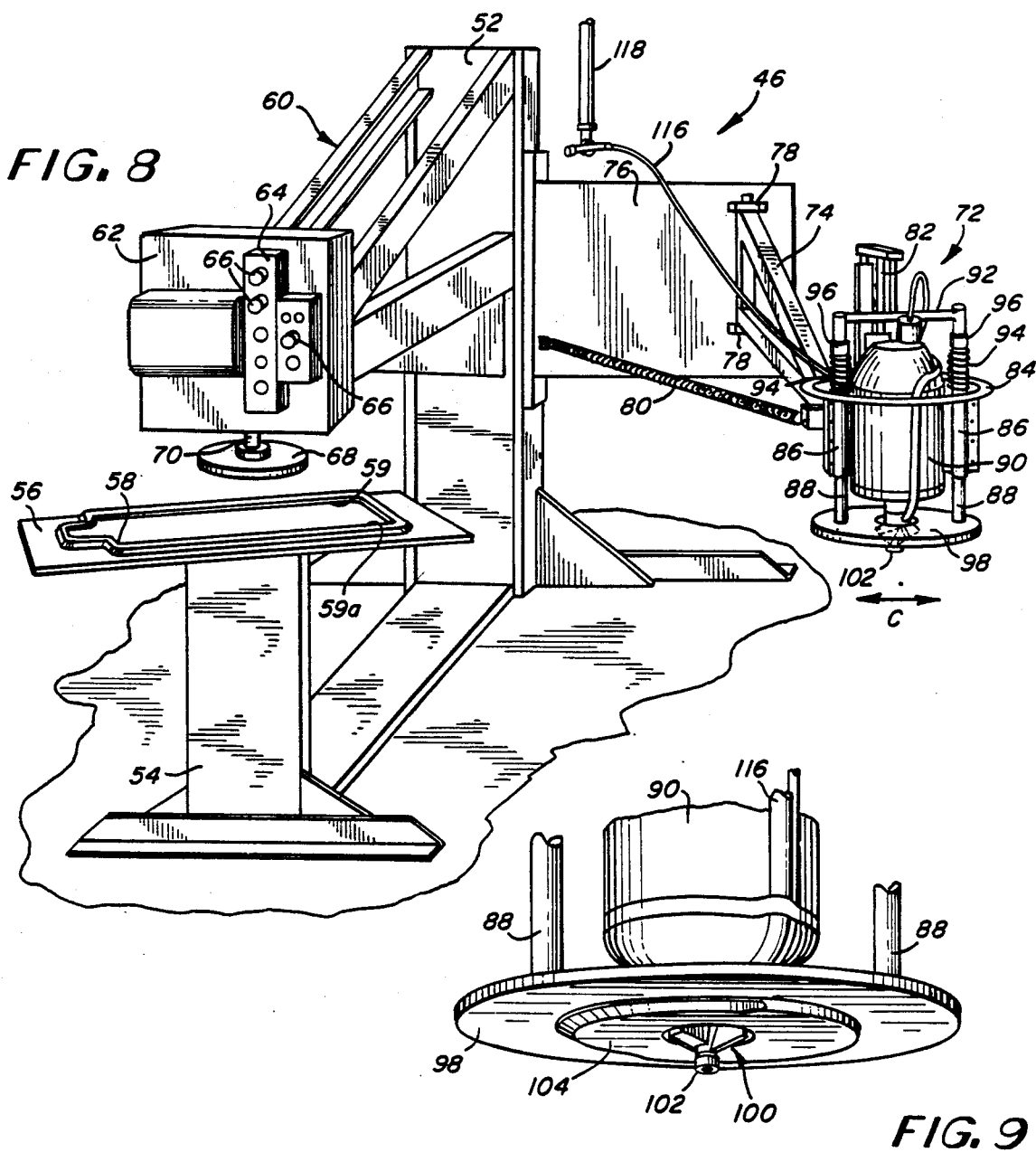
FIG. 8
FIG. 9

METHOD OF PRODUCING CHAIR MATS AND THE LIKE INVOLVING EDGE TRIMMING

BACKGROUND OF THE INVENTION

This invention relates to apparatus and a method of producing articles form thermoplastic material and, particular, to apparatus and a method of producing chair or floor mats for supporting castered chairs or the like on a subjacent support surface or floor.

It is well known in the art that chair mats are placed on top of carpeting in offices, for instance, so that when castered furniture rolls across the surface of the mat it does so more easily than rolling across the surface of a carpeted floor. Most offices throughout the country use such chair mats with carpeted flooring, as well as to prevent marring of other types of flooring.

Many such chair mats include integral elongated projections or cleats extending transversely from the lower surface of the mat. This also is true of elongated runners of thermoplastic material, such as vinyl, used in homes as a protective overlay for expensive carpeting. The projections or cleats are provided to prevent mats or runners from sliding relative to the surface of the carpet.

Machines are known for forming plastic material into elongated webs and for defining, or embossing, by pressure, a continuous pattern in the surface of the web to a relatively shallow depth. An improvement in such machines and processes is disclosed in U.S. Pat. No. 3,430,291 to Charles F. Hlinka, dated Mar. 4, 1969, and assigned to the assignee of this invention. Hlinka shows a novel machine and process for economically producing an endless web or runner with well defined, elongated cleats thereon that extend transversely to the plane of the web. This is done by extruding a thermoplastic sheet between a pair of calendering or pressure rollers, one of which is provided with elongated, vented extrusion bores into which heated plastic of the web in molten form is forced to form the cleats. However, Hlinka forms the projections or cleats in a continous manner over substantially the entire linear dimensions of the web.

Continuous cleated webbing as produced by the Hlinka process and/or machine can be used for producing chair mats, including irregularly shaped mats which have a forward projecting tongue portion normally positionable under a desk top between the side drawer portions of the desk. The mat is cut from the continuous webbing, in the desired shape, and the projections or cleats span substantially the entire underside of the mat.

However, there have been at least two major problems with chair mats, particularly when used with carpeting having relatively thick pile. First, it is quite difficult to roll castered furniture onto and off of the edge of the mat. Second, the mat edge creates a safety hazard because individuals are prone to trip over the edge of the mat. These problems are caused because the peripheral edges of such mats are quite abrupt.

It has been proposed, and copending application Ser. No. 746,139 filed June 18, 1985 and now abandoned, assigned to the assignee of this invention, discloses a peripheral approach ramp edge integral with the mat itself and having proven parameters which provide for easy rolling of castering furniture onto and off of the mat, while still preventing chipping or cracking of the mat. However, such a peripheral approach ramp cannot be formed with a mat having cleats on the underside thereof in the peripheral area adjacent the approach ramp.

This invention is directed to solving the aforesaid problems by providing an apparatus and method for producing a thermoplastic web with relatively elongated projections or cleats thereon to form chair mats, or the like, in predetermined sizes and with projections in discrete patterns so as not to interfere with forming the peripheral approach ramp thereabout.

Another problem is forming the approach ramp itself. Routing, trimming or similar machines are known for making cuts in workpieces or trimming the edges of workpieces to provide a finished appearance. However, many trimming machines are little more than buffing machines for smoothing the edges of the workpieces.

One are where edge trimming is required is in the field of manufacturing chair mats which, today, are most prevalently fabricated of vinyl or plastic material. The chair mats are irregularly shaped in that they normally include a front tongue portion for inserting beneath a desk between side drawer portions of the desk. The plastic mat normally is die cut to such a configuration and then the sharp edges are trimmed by buffing procedures which do not actually remove a significant amount of material from the mat edge.

The machine and method of this invention is directed to routing a considerable portion of the mat edge to form a beveled ramp about the mat to enable rollers or casters of chairs to easily ride onto and off of the chair mat. Control of the router is quite important so that the ramp edge is of a uniform width for aesthetic reasons.

Another problem in providing such a ramp edge is to control the thickness of the router cut so that the distal edge of the mat at the base of the ramp is not unduly thin to avoid chipping and cracking of the periphery of the mat. A further problem in routing vinyl or plastic material is to prevent undue pressure of the router blade against the mat edge. Too much pressure causes drag and excesive heat.

This invention solves the problem and satisfies the needs outlined above.

SUMMARY OF THE INVENTION

An object, therefore, of this invention is to provide a new machine and method for producing a thermoplastic web with relatively elongated projections thereon to form chair mats, or the like, in predetermined sizes and with projections in discrete patterns.

Another object is to provide a machine and method of the character described for forming discrete patterns of projections or cleats on the underside of a chair mat, with a marginal area completely about the periphery of the mat void of projections.

A further object is to provide a new machine and method for triming the edge of workpieces, such as generally planar workpieces.

Still another object is to provide a machine and method of the character described for cutting or routing a beveled ramp edge about the irregular periphery of a chair mat or similar generally planar workpiece.

In the exemplary embodiment of the invention, the portion of the apparatus for forming a thermoplastic web with projections in discrete patterns includes a forming roll and means for rotating the forming roll. Means are located adjacent the forming roll for extruding a sheet of thermoplastic material thereon. The forming roll has a cylindrical outer surface with depressions for forming the elongated projections. The forming roll is of a sufficiently large diameter and the depressions are in a discrete pattern to form at least one chair mat per single revolution of the forming roll, with a marginal area completely about the periphery of the mat void of projections. This provides an area for forming an integral approach ramp about the periphery of the mat.

Means also are provided for continuously removing the thermoplastic sheet from the forming roll, with the discrete pattern of projections repeating at spaced intervals. Means are provided for cutting the sheet seriatim between the repeating patterns to form sheet sections having a single pattern of projections on each section. Means are provided for cutting a chair mat of predetermined size from a sheet section with uniform marginal area about the periphery of the mat void of projections.

Finally, novel means are provided for forming a beveled edge about the periphery of the mat to define the aforesaid approach ramp thereabout.

In forming the approach ramp, a machine is provided which includes a work table for positioning the workpiece. The table is rotatable about an axis extending generally perpendicular to and through the plane of the workpiece. A planar template is fixed to the top of the work table and has the same size and shape of the workpiece to be operated upon. The template defines an outer peripheral guiding edge. A pressure plate is provided for holding the workpiece properly positioned on top of the template.

A router head is pivotally mounted on the machine for movement in a plane generally parallel to the workpiece and template toward and away from the edges thereof. The router head carries a router motor, a router blade and a cam follower roller. Spring means biases the router head toward the work table to bias the cam follower roller against the peripheral guiding edge of the template and the router blade against the edge of the workpiece. A cam plate on the bottom of the router head rests on top of the workpiece to control the depth of cut and define the thickness of the workpiece at its extreme outer edge at the base of the ramp.

The router head includes a generally rigid frame and means are provided for resiliently mounting the router motor thereon so that the motor and router weight is supported by the spring means to relieve pressure on the workpiece.

The router blade includes a plurality of blade sections with inclined blade edges for routing a beveled edge about the periphery of the workpiece. At least one notch is formed in the inclined blade edge.

Means are provided on the router head for directing a cooling medium toward the area of engagement between the router blade and the edge of the workpiece. Preferably, the cooling medium comprises a liquid mist supplied from a source thereof.

The invention contemplates a method of trimming the edge of a generally planar workpiece, such as a chair mat or the like, and includes the steps of providing a work table for positioning the workpiece and a router head including a router engageable with the edge of the workpiece. In the method, the work table and router head are relatively rotated about an axis generally perpendicular to and through the plane of the workpiece. the router is guided along the edge of the workpiece during said relative rotation. The workpiece is aligned with a template on the work table. The router head is guided along the edge of the template. The router head and thus the router is biased into engagement with the template and the edge of the workpiece during said relative rotation. A cooling medium in the form of a liquid mist is directed toward the area of engagement between the router and the edge of the workpiece during a routing operation.

Other objects, features and advantages of the invention will be apparent from the following detailed description taken in connection with the accompanying drawings.

DESCRIPTION OF THE DRAWINGS

The features of this invention which are believed to be novel are set froth with particularity in the appended claims. The invention, together with its objects and the advantages thereof, may be best understood by reference to the following description taken in conjunction with the accompanying drawings, in which like reference numerals identify like elements in the figures and in which:

FIG. 6 is a plan view of a workpiece in the form of a chair mat trimmed in accordance with the machine and method of this invention;

FIG. 7 is a fragmented section, on an enlarged scale, taken generally along line 7—7 of FIG. 6;

FIG. 8 is a perspective view of the bevelling machine of this invention;

FIG. 9 is a perspective view, on an enlarged scale, of the underside of the router head of the machine shown in FIG. 8;

DETAILED DESCRIPTION OF THE PREFERRED EMBODIMENT

This invention is directed to apparatus and method for producing a thermoplastic web with relatively elongated projections or cleats thereon to form chair mats, or the like, in predetermined sizes and with projections in discrete patterns. The invention also is directed to machine and method for trimming the edge of a generally planar workpiece, such as a chair mat, to provide a beveled ramp edge thereabout. The apparatus and method begin with molten thermoplastic material and end with a complete chair mat with an inclined approach ramp therabout and with cleats on the underside thereof.

Figure 1:
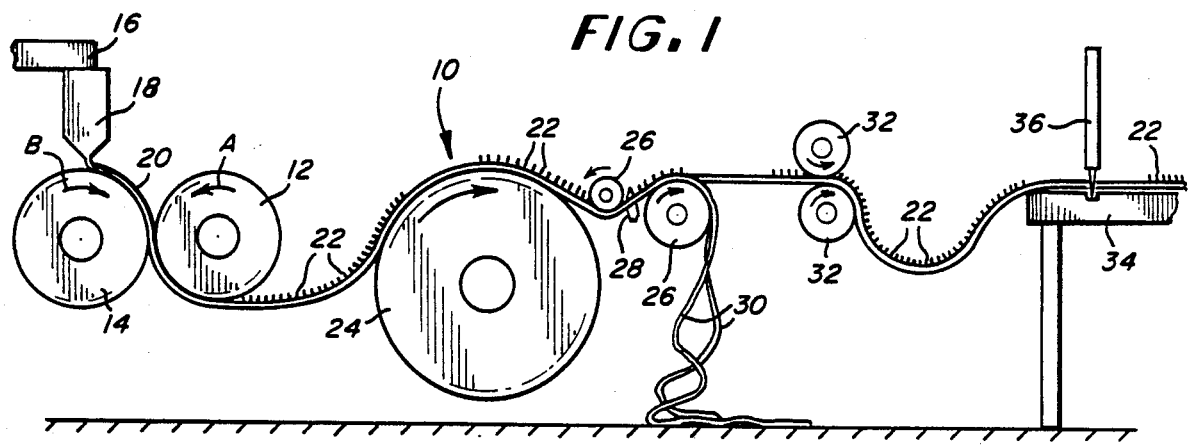
FIG. 1 is a somewhat schematic elevation of a machine and method for forming cleated webbing for producing a workpiece in the form of a chair mat.

Turning to the drawings, and first to FIGS. 1-5, an apparatus, generally designated 10 (FIG. 1) is provided for producing a thermoplastic web with relatively elongated projections thereon to form chair mats, or the like, therefrom in predetermined sizes and with projections in discrete patterns. More particularly, FIG. 1 shows a forming roll 12 rotable in the direction of arrow A by appropriate motor means (not shown). A pressure roll 14 is mounted for rotation about an axis generally parallel to pressure roll 12. Means are provided for supplying thermoplastic material in molten form and includes a conventional extruder 16. The thermoplastic material can be any thermoformable plastic material, as contrasted with a thermosetting substance. The thermoplastic material is melted and forced into a flat sheet extrusion die 18 at a controlled rate by extruder 16. The die discharges the thermoplastic material in the form of a film or sheet 20 which is carried directly and tangentially by the cylindrical outer surface of pressure roll 14 in the direction of arrow B. As will be explained in more detail, forming roll 12 has a smooth outer cylindrical surface with depressions therein corresponding to the desired, discrete pattern of projections or cleats 22 on the web or sheet. Although the spacing is exaggerated in the drawing, the thickness of the web is determined by the spacing between forming roll and pressure roll 14 as the molten or soft web 20 is caused to pass therebetween.

After web 20 passes between rolls 12, 14, the web passes over a conventional cooling roller 24 which has a cooling medium, such as water, circulated therethrough to harden the molten web. Of course, the web already has begun hardening from its initial molten state emanating from die 18, as it passes through atmosphere. The web then passes between a pair of idler rollers 26. At a point between the idler rollers, a pair of knives 28 are positioned along opposite edges of the web to trim marginal portions 30 from the web whereby the web is provided with precise, parallel edges which could not be formed simply at the extruder die. A pair of feed rollers 32 facilitate the movement of the web and feeding the web to a cutting table 34. A cutting knife 36 is provided at table 34 for cutting the web seriatim between repeating patterns to form sheet or web sections having a single pattern of projections 22 on each sheet section, as described in relation to FIGS. 3-5.

Figure 2:
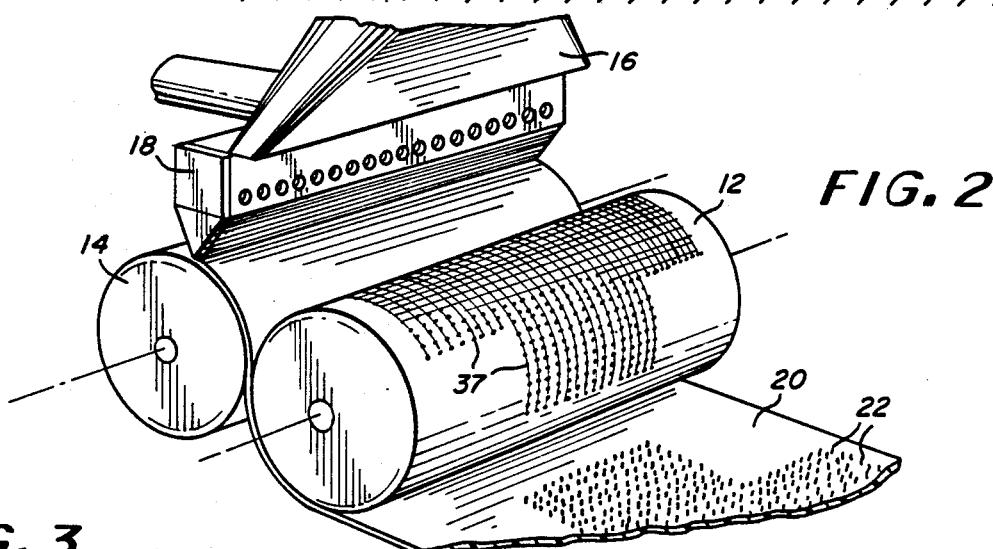
FIG. 2 is a perspective view of the extrusion means and forming roll producing a continous web with discrete patterns of projections thereon at spaced intervals.

FIG. 2 shows more clearly the arrangement of extruder 16, die 18, pressure roll 14, and forming roll 12. In particular, it can be seen that forming roll 12 has a cylindrical outer surface with depressions 37 for forming the elongated projections 22 on web 20. It is important to note that forming roll 12 is of a sufficiently large diameter to permit an entire pattern of projections or cleats 22 to be formed on web 20 per single revolution of the forming roll, sufficient to provide a pattern of projections for at least one complete chair mat and with a marginal area completely about the periphery of the mat void of projections. In practice, a standard size chair mat has required a forming roll on the order of 21-22 inches in diameter. Heretofore, much smaller forming rolls have been used because there has been no contemplation of providing spaced, discrete patterns of cleats on the web. Heretofore, the cleats were formed on the web in a continuous running pattern covering substantially the entire width of the web and certainly the entire linear running dimensions of the web.

Figure 3:
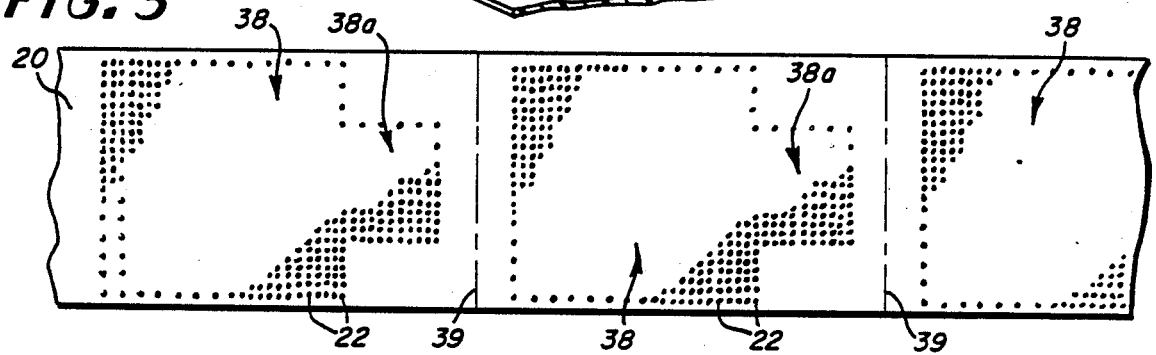
FIG. 3 is a plan view of a trimmed web illustrating the discrete, spaced patterns of projections.

FIG. 3 shows a portion of a continous length of the web 20 having discrete patterns 38 of projections 22 repeating at spaced intervals. For instance, pattern 38 might include a smaller forward pattern portion 38a which provides cleats on the underside of a front tongue portion of a chair mat, described hereinafter, which is insertable beneath a desk top between side drawer portions of the desk.

FIG. 3 shows the condition of web 20 between idler rollers 26 and cutting table 24 after the marginal edges 30 of the web have been trimmed by knives 28 and before the continuous web reaches cutting table 34. At cutting table 34, means such as knife 36 is utilized to cut continuous web 20 into separate sheet sections having a single pattern 38, 38a of projections or cleats 22 on each sheet section. For instance, cutting lines 39 are shown in phantom in FIG. 3 to illustrate approximate locations for cutting by knife 36. These sections are then moved to precise cutting station wherein conventional means, such as press or die blades, are provided for cutting a precisely dimensioned chair mat from each sheet section, similar to the chair mat shown in FIG. 6. The mat is cut to a predetermined size from the sheet section so as to provide a uniform marginal area about the periphery of the mat void of projections or cleats. This is important to facilitate forming a beveled ramp edge about the periphery of the mat, as described in relation to FIGS. 6-13.

Figure 4:
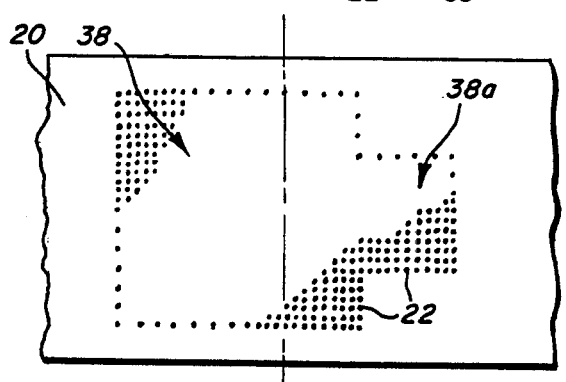
FIG. 4 is a fragmented plan view of a section of a web having one pattern of projections.
Figure 5:
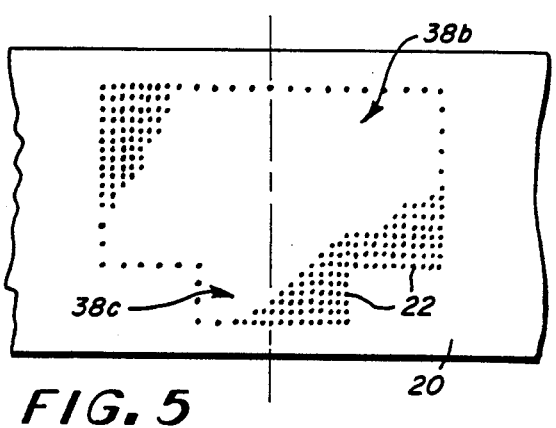
FIG. 5 is a fragmented plan view of a section of a web having another pattern of projections.
Figure 10:
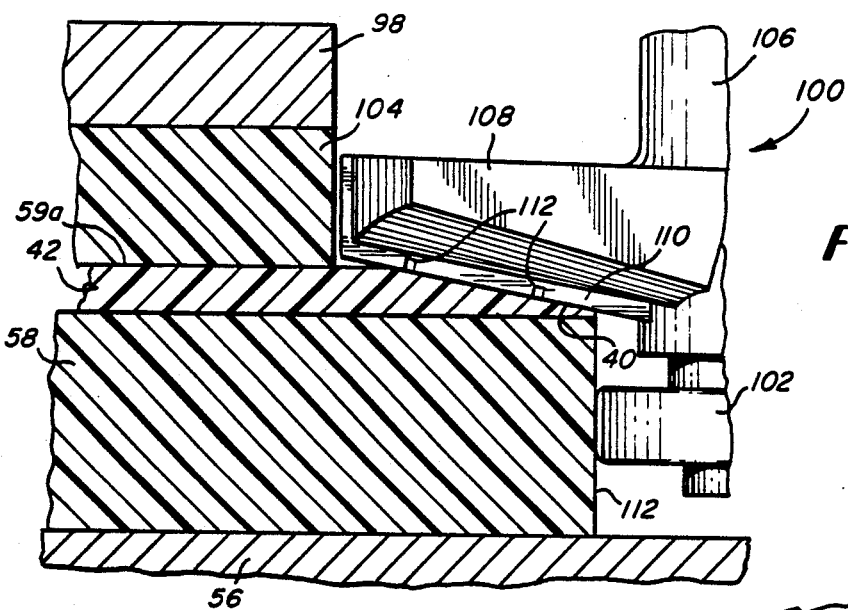
FIG. 10 is a fragmented vertical section, on a further enlarged scale, through the edge of the workpiece, the template and the work table, showing a router blade and the cam follower roller in engagement with the workpiece and template, respectively.

FIGS. 4 and 5 simple are shown in juxtaposition to illustrate different types of discrete patterns of projections which might be formed on web 20. FIG. 4 shows a smaller portion of the web of FIG. 3 with a similar pattern 38, 38a of projections formed thereon. Of course, it can be seen that the "tongue" portion of the eventual chair mat faces in the elongated direction of the web. In contract, FIG. 5 shows that a pattern 38b of projections 22 can be formed with a smaller pattern portion 38c protruding transversely of the elongated web to form a different shaped floor mat. Pattern 38b would facilitate forming a much wider floor mat than could be permitted by orienting the pattern as in FIG. 4.

The invention contemplates a method of producing a thermoplastic web with relatively elongated projections 22 thereon to form chair mats, or the like, in predetermined sizes and with projections in discrete patterns, such as patterns 38-38d. The method includes the steps of extruding a sheet of thermoplastic material and forming a discrete pattern of projections on the sheet to form cleats on at least one complete chair mat with a marginal area completely about the periphery of the mat void of projections. The method also includes the steps of continuously forming the discrete pattern of projections at repeating, spaced intervals along the sheet, and cutting the sheet seriatim between the repeating patterns to form sheet sections having a single pattern of projections on each sheet section. The method further includes cutting a chair mat of predetermiend size from the sheet section with a uniform marginal area about the periphery of the mat void of projections, and forming a beveled edge about the periphery of the mat as described hereinafter.

Referring now to FIGS. 6 and 7, the apparatus and method are directed to forming a beveled ramp edge 40 about the periphery of a chair mat 42. The chair mat is irregularly shaped in a conventional configuration including a front tongue portion 42a which, as is known, is insertable beneath a desk top between side drawer portions of the desk.

Various problems have been encountered in forming such a beveled ramp edge 40 because of the relatively thin dimensions of the workpiece or chair mat. Details of a chair mat formed in accordance with the machine and method of this invention are disclosed in co-pending application Ser. No. 746,139, filed June 18, 1985, and now abandoned filed contemporaneously herewith, assigned to the assignee of this application, and incorporated herein by reference. Suffice it to say, the chair may be may on the order of 0.135 inch in thickness. It also has been found that beveled ramp edge 40 is quite efficient in permitting easy rolling onto and off of the mat by chair rollers or casters, if the ramp edge is on the order of 11° to the horizontal. With such parameters, one of the critical problems is to insure that the extreme outer edge 44 (FIG. 7) of the mat at the base of the ramp edge 40 is not unduly thin which might cause chipping or cracking. In addition, because of the small angle of the ramp edge, problems arise in maintaining a uniform width of the ramp edge about the periphery of the mat. Slight deviations can cause considerable differences in the width of the ramp edge about the periphery of the chair mat, resulting in quite undesirable appearances. These problems are avoided by the machine of this invention wherein various controls, guides and other features are embodied in the machine to provide a high degree of control of the routing or trimming operation.

More particularly, referring to FIG. 8, a machine, generally designated 46, is provided for forming beveled ramp edge 40 about the periphery of a generally planar workpiece, such as chair mat 42. The machine includes a frame structure having a base portion, generally designated 48, for mounting a floor 50. The frame structure further includes a rear, upright frame portion 52, and a forward, upright frame portion 54. Upright frame portion 54 defines a pedestal for rotatably mounting a work table 56 onto the top thereof. A template 58 is fixed to the top of work table 56. Conventional means such as a motor and drive shaft are housed in pedestal 54 for rotating work table 56 and template 58. The template is planar and has the same size and shape as the peripheral edge of chair mat 42. A conventional motor and drive shaft (not shown) are operatively associated with work table 56 within pedestal 54 to rotate the work table, the template and a properly positioned workpiece at a desired speed of rotation.

It should be noted that template 58 is recessed as indicated at 59. This recess corresponds to the pattern 38-38d of cleats 22 described in relation to FIGS. 1-5. Therefore, the flat marginal area on the underside of mat 42, void of cleats, rests securely on a marginal ledge 59a about the periphery of template 58. FIG. 7 shows a marginal area 42a about the periphery of the underside of mat 42 void of cleats 22.

The frame structure also includes a generally horizontal, frame arm portion, generally designated 60, projecting forwardly from upright rear frame portion 52. A control box 62 is mounted on the distal end of frame arm portion 60. A control panel 64 is provided on the front of control box 62 for ready access to various manually manipulatable control elements 66. A pressure plate 68 on the lower end of a shaft 70 projects downwardly from control box 62 and can be raised and lowered by conventioanl pneumatic means, for instance, from within control box 62. Pressure plate 68 is raised and lowered to hold a chair mat 42 in proper position on top of template 58. It should be understood that the various wiring and pneumatic conduits and other control couplings are not shown in FIG. 8 to avoid unduly cluttering the illustration.

A router head, generally designated 72, is mounted on the distal end of a frame arm 74 projecting forwardly from a rear frame panel 76. Frame arm 74 is pivotally mounted on rear frame panel 76 by hinge brackets 78 to permit the router head to be moved toward and away from work table 56, template 58 and a properly positioned workpiece, as indicated by double headed arrows "C". Biasing means in the form of a coil spring 80 is connected between router head 72 and rear frame panel 76 and biases the router head and the various components thereof toward the work table and workpiece.

Router head 72 includes a generally rigid frame structure including an upright frame portion 82, a circular ring 84 and a pair of vertical sleeves or cylinders, all integrally mounted on the front end of frame arm 74. Ring 84 provides a handle for manually manipulating the router head. Sleeves 86 define vertical cylinders through which a pair of vertical support rods 88 extend. A router motor 90 is supported on a cross rod 92 extending between vertical support rods 88. A pair of coil springs 94 surround rods 88 and are sandwiched between the tops of cylinders 86 and fixed collars 96 on rods 88. A lower router head plate 98 is fixed to the lower distal ends of rods 88. Thus, the composite structure of router motor 90, support rods 88 and 92, and lower plate 98 float in a vertical direction relative to the rigid frame structure comprising frame portion 82, ring 84 and cylinders 86. The weight of this composite structure is carried primarily by springs 94.

Referring to FIG. 9, a router blade, generally designated 100, can be seen projecting downwardly below router head plate 98. The router blade is rotatably driven by the drive shaft of router motor 90. A cam follower roller 102 projects downwardly from router blade 100 for purposes described in greater detail hereinafter. Router head plate 98 includes an integral, circular cam disk 104 for riding over the top edge portion of the workpiece or chair mat 42 as router head 72 is moved toward work table 56 to bring the cam follower roller into engagement with the peripheral edge of template 58 and router blade 100 into engagement with the workpiece.

Referring to FIGS. 10-13, router blade 100 includes a vertical shaft portion 106 connected to the drive shaft of router motor 88. The blade includes a plurality of blade sections 108 projecting radially outwardly from blade shaft 106. Each blade section includes an inclined blade edge 110 for forming or routing beveled ramp edge 40 about chair mat 42. Each blade edge 110 has at least one notch 112 cut thereinto intermediate the ends thereof. The notches eliminate the formation of "strands" of plastic material from the workpiece during the routing operation.

Cam follower roller 102 is mounted below blade sections 108 precisely concentric with the axis of blade shaft 102. The roller includes internal bearings 102a to provide free rotation thereof relative to the blade itself.

It can be seen in FIG. 8 that cam follower roller 102 engages the outer peripheral edge 112 of template 58 which is fixed to work table 56. Therefore, as the work table and template rotate, the roller precisely follows the contour of the template. With chair mat 42 held down onto template 58 by pressure plate 68 (FIG. 8), the precise positioning of the chair mat or other workpiece relative to blade sections 108 and blade edges 110 is precisely maintained. Spring 80 (FIG. 8) maintains constant engagement between cam follower roller 102 and peripheral edge 122 of template 58. Consequently, the width of beveled edge 40 (FIG. 7) is precisely maintained along the entire peripheral edge of the chair mat. In addition, cam disk 104 seats on top of chair mat 42 and is held in engagement therewith by the controlled weight of the router motor. This precisely controls the depth of cut by the router blade to insure that the thickness of the extreme outer edge 44 (FIG. 7) of the chair mat is maintained at a predetermined dimension which will prevent chipping or cracking. All of these controls are facilitated at the outset by forming the chair mat with a pattern of cleats where the marginal area 42a about the periphery of the underside of the mat is void of cleats that would prevent precise routing controls.

Figure 11:
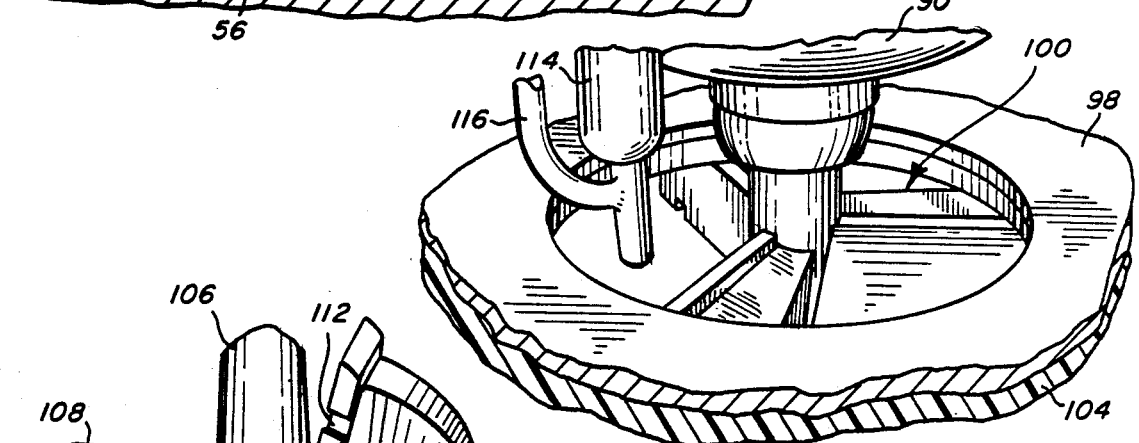
FIG. 11 is a fragmented perspective view, on an enlarged scale, of a portion of the router head, illustrating the nozzle for directing the cooling medium.
Figure 12:
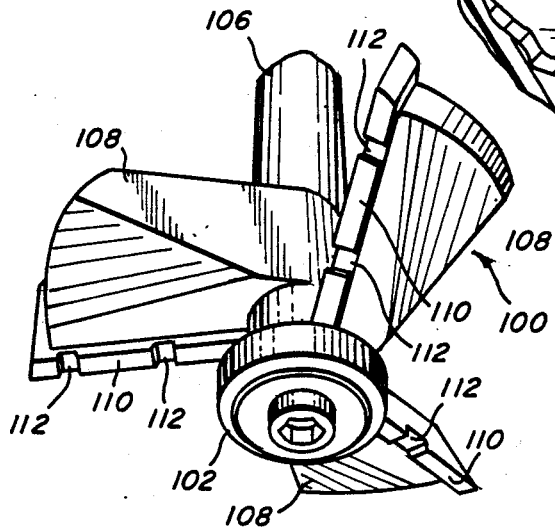
FIG. 12 is a perspective view of the router blade and cam follower roller.
Figure 13:
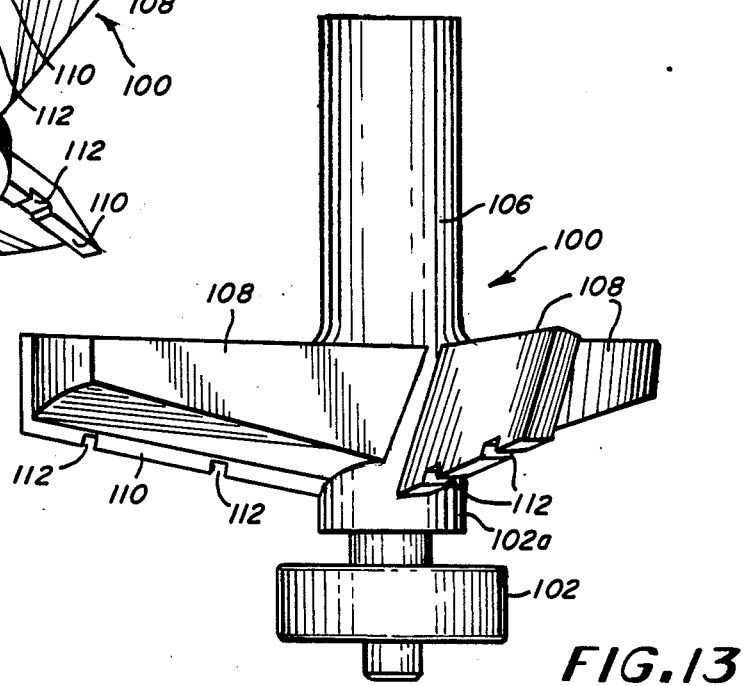
FIG. 13 is an elevation, on an enlarged scale, of the router blade and cam follower roller of FIG. 12.

Lastly, referring to FIG. 11, means are provided for directing a cooling medium toward the area of engagement between router blade sections 108 and the edge of the workpiece. More particularly, a nozzle 114 is mounted on router head 72 for directing a liquid mist toward said area during a routing operation. A conduit 116 leads from nozzle 114 to a liquid source 118 (FIG. 8).

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of trimming the edge of a generally planar workpiece, comprising the steps of:
   providing a work table for positioning the workpiece;
   providing a router head including a router blade engageable with the edge of the workpiece;
   relatively rotating the work table and router head about an axis extending generally perpendicular to and through the plane of the workpiece; and
   guiding the router blade along the edge of the workpiece during said relative rotation and controlling biasing forces applied to the workpiece edge by the router blade.

2. The method of claim 1 wherein template means is provided on the work table, and including the steps of aligning the workpiece on the template means.

3. The method of claim 2 wherein the router head is guided along the edge of said template means.

4. The method of claim 1 wherein the biasing forces applied to the router blade during engagement with the edge of the workpiece during said relative rotation causes trimming of the workpiece edge to the desired depth and width.

5. The method of claim 1 wherein the work table is rotated about said axis, and the router head is moved toward and away from the workpiece during said rotation.

6. The method of claim 1, including the step of directing a cooling medium toward the area of engagement between the router blade and the edge of the workpiece.

7. The method of claim 6, including directing a liquid mist toward said area during a routing operation.

8. A method of trimming the edge of a generally planar workpiece, comprising the steps of:
   providing a work table for positioning the workpiece;
   providing a router head including a router blade engageable with the edge of the workpiece;
   rotating the work table relative to the router head about an axis extending generally perpendicular to and through the plane of the workpiece; and
   guiding the router blade along the edge of the workpiece during said relative rotation, said step of guiding comprising rotating a cam follower roller independent of the rotation of the router blades, and biasing said cam follower roller against the workpiece edge.

9. The method as defined in claim 8 further including template means for positioning the workpiece coupled thereto and wherein said cam follower roller rotates against the edge of said template means about the same axis as said router blade.

10. A method of trimming the edge of a generally planar workpiece, comprising the steps of:
    providing a work table for positioning the workpiece;
    providing a router head including a router blade engageable with the edge of the workpiece;
    rotating the work table and moving the router head about an axis extending generally perpendicular to and through the plane of the workpiece; and
    guiding the router blade along the edge of the workpiece during said relative rotation and controlling the weight of the router blade on the edge of the workpiece.

11. The method as defined in claim 10 further including template means for positioning the workpiece coupled thereto and a cam follower roller rotating against the edge of said template means and rotating independent of and about the same axis as said router blade.

12. A method of trimming the edge of a generally planar workpiece, comprising the steps of:
    providing a work table for positioning the workpiece;
    providing a router head including a router blade engageable with the edge of the workpiece;
    rotating both the work table and the router head about an axis extending generally perpendicular to and through the plane of the workpiece; and
    guiding the router blade along the edge of the workpiece during said relative rotation and biasing the router blade against the edge of the workpiece to assist in generating a uniform width for the workpiece edge.

13. The method as defined in claim 12 further including template means for positioning the workpiece coupled thereto and a cam follower roller rotating against the edge of said template means and rotating independent of and about the same axis as said router blade.

14. The method of claim 3 wherein the step of guiding the router blade comprises rotating a cam follower roller along the template means edge.

15. The method as defined in claim 14 wherein the rotation of the cam follower roller is independent of the rotation of the router blades.

16. A method of trimming the edge of a generally planar workpiece, comprising the steps of:
    providing a work table for positioning the workpiece;
    providing a router head including a router blade engageable with the edge of the workpiece;
    rotating the work table and moving the router head about an axis extending generally perpendicular to and through the plane of the workpiece;
    guiding the router blade along the edge of the workpiece during said relative rotation;
    controlling the weight of the router blade on the edge of the workpiece; and biasing the router blade against the edge of the workpiece.

17. A method of trimming the edge of a generally planar workpiece, comprising the steps of:
   providing a work table for positioning the workpiece;
   providing a router head including a router blade engageable with the edge of the workpiece;
   rotating both the work table and the router head about an axis extending generally perpendicular to and through the plane of the workpiece;
   guiding the router blade along the edge of the workpiece during said relative rotation; and
   biasing the router blade against the edge of the workpiece and controlling the weight of the router blade against the workpiece to assist in generating a uniformly trimmed profile for the workpiece edge.

18. The method of claim 1 further comprising the step of controlling vertical forces applied to the workpiece edge by the router blade.

19. The method of claim 18 wherein the biasing force and the controlled weight of the router applied to the router blade during engagement with the edge of the workpiece causes trimming of the desired depth and width of the workpiece.

* * * * *